L. P. KELLEY.
ARTIFICIAL TROLLING BAIT.
APPLICATION FILED MAR. 2, 1920.

1,368,939.

Patented Feb. 15, 1921.

Inventor
Louis P. Kelley,
By
Attorney

UNITED STATES PATENT OFFICE.

LOUIS P. KELLEY, OF CENTER HARBOR, NEW HAMPSHIRE.

ARTIFICIAL TROLLING-BAIT.

1,368,939.   Specification of Letters Patent.   Patented Feb. 15, 1921.

Application filed March 2, 1920. Serial No. 362,863.

*To all whom it may concern:*

Be it known that I, LOUIS P. KELLEY, a citizen of the United States of America, residing at Center Harbor, in the county of Belknap and State of New Hampshire, have invented new and useful Improvements in Artificial Trolling-Baits, of which the following is a specification.

The object of the invention is to provide a simple and relatively inexpensive trolling bait suitable for use in fishing for lake trout, salmon and the like, whereby the advantages of attracting the fish by simulating a minnow, chub or smelt are supplemented by the fact that in the event of the bait becoming snagged or caught in rocks or submerged obstructions, it may be freed with the loss only of a hook, and the further advantage that the substitution or replacement of damaged or broken hooks may be readily effected by the fisherman without loss of time and without requiring the use of special tools or implements; and with these objects in view the invention consists in a construction and combination of parts of which a preferred embodiment is shown in the accompanying drawing, wherein:

Figure 1:
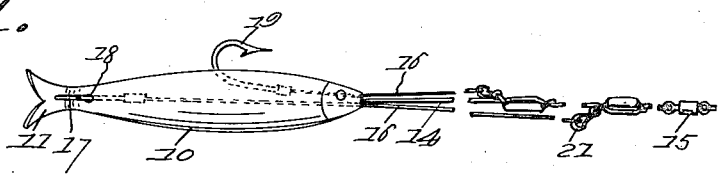
Figure 1 is a side view of the bait connected in the operative position to a leader.
Figure 2:
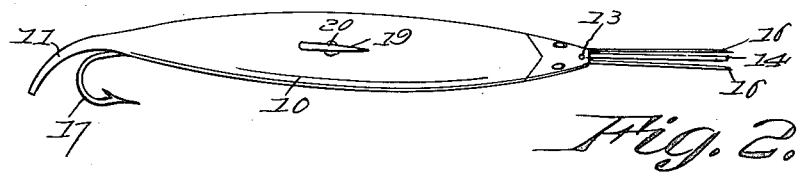
Fig. 2 is a plan view of the same.
Figure 3:
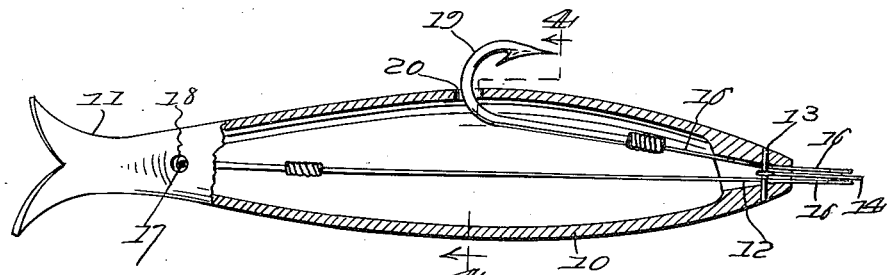
Fig. 3 is an enlarged longitudinal section.
Figure 4:
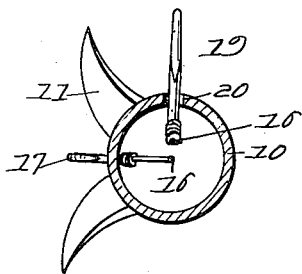
Fig. 4 is a detail transverse section on the plane indicated by the line 4—4 of Fig. 3.
Figure 5:
Fig. 5 is a detail view of one of the leader snaps by which the connection of the hook snoods may be effected.

The body of the bait indicated at 10 is preferably of a soft or flexible material such as felt or the like of a sufficient stiffness to hold it in the proper shape to represent a fish of the minnow, chub or smelt type, said body being hollow as indicated in Fig. 3 and being provided at its rear end with a tail portion 11 which is deflected laterally as shown, to act as a spinner or propeller to give a rotary movement to the bait as the latter is drawn through the water, the forward end of the body being provided with a guide 12 intersected by a draft pin 13 to which is connected the leader 14, so that the body of the bait is connected with the trolling line directly and receives its motion therefrom through the usual swivel 15 which obviously permits of the spinning movement of the bait without twisting or untwisting the trolling line.

The guide 12 in the forward end of the body serves as an exit from the interior of the body of the hook snoods 16 of which one or more may be employed according to the number of hooks with which it is desired to equip the bait, the provision in this respect as indicated in the drawing being for two hooks of which one, shown at 17 and which may be designated as the tail hook, is extended through an opening 18 in the wall of the body and is located in the concave curve of the tail portion of the bait so as to be relatively inconspicuous. The other hook 19 which may be designated as the forward or fin hook is preferably extended through an outlet opening 20 in the back of the bait body to occupy a position corresponding with the back fin of a fish where it is unlikely to attract attention particularly owing to the movement of the bait due to the strain upon the trolling line and which as is usual with such devices produces an irregular movement of the body of the bait.

The hook snoods are preferably engaged with snap hooks 21 connected with the leader, so that in the event that the bait should become caught or snagged as by engagement with a rock or submerged log or branch, the usual cause of snagging being the engagement of one of the hooks with such obstruction, a strong pull upon the trolling line, assuming that the leader is of suitable and proper strength, will cause the breaking of the hook and hence the liberation of the bait, to the end that the loss of the latter may be avoided. Obviously a new hook may be replaced for that which has been broken merely by threading the same through the proper outlet opening in the wall of the body and through the guide opening at the forward end of the latter.

It will also be understood that the number of hooks employed may be reduced or multiplied as may be found desirable and the size or gage of the hook may be varied to suit the character or size of the fish sought by the operator and may be changed from time to time as found desirable to suit the conditions, the season and the peculiarities of the locality or waters.

I claim—

1. A trolling bait having a hollow body in the general form of a live bait, and having a leader directly connected therewith, said body being provided in its wall with an outlet opening for the reception of a hook for projection beyond the exterior surface of the body and at its forward end with a guide opening for the passage of the hook snood, and the leader being provided with means for engaging the hook snood.

2. A trolling bait having a hollow body in the form of a bait fish provided with a laterally deflected tail portion or spinner and a leader connected directly with the body at its forward end, said body being provided in its wall with one or more hook-receiving openings and at its forward end with a guide opening for the hook snoods, and a leader being provided with means for engagement with the hook snoods.

3. A trolling bait having an elongated hollow body provided at its rear end with a laterally deflected tail portion or spinner and at its forward end with a snood guide, and a leader connected with the forward end of the body, the latter being provided in the concave side of its tail portion with a hook seat, and a leader being provided with means for engagement with the hook snood.

In testimony whereof I affix my signature.

LOUIS P. KELLEY.